(12) United States Patent
Butler et al.

(10) Patent No.: US 10,728,749 B1
(45) Date of Patent: *Jul. 28, 2020

(54) WIRELESS USER DATA SERVICE WITH ENHANCED RELIABILITY

(71) Applicant: Sprint Communications Company L.P., Overland Park, KS (US)

(72) Inventors: Robert Keith Butler, Overland Park, KS (US); Lyle T. Bertz, Lee's Summit, MO (US); Daniel Joe Sershen, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/795,318

(22) Filed: Feb. 19, 2020

Related U.S. Application Data

(63) Continuation of application No. 16/246,804, filed on Jan. 14, 2019, now Pat. No. 10,609,551.

(51) Int. Cl.
*H04W 8/30* (2009.01)
*H04W 64/00* (2009.01)
*H04W 24/04* (2009.01)

(52) U.S. Cl.
CPC ............. *H04W 8/30* (2013.01); *H04W 24/04* (2013.01); *H04W 64/003* (2013.01)

(58) Field of Classification Search
CPC ............ G06F 3/1454; H04N 21/43615; H04N 21/44029; H04N 21/4122; G09G 5/00; G09G 2370/16; G09G 2340/0442; G09G 2370/04; G09G 2340/0492; G09G 2340/14

See application file for complete search history.

(56) References Cited

U.S. PATENT DOCUMENTS

| | | |
|---|---|---|
| 7,054,271 B2 | 5/2006 | Brownrigg et al. |
| 7,450,531 B2 | 11/2008 | Iyer et al. |
| 7,702,817 B2 | 4/2010 | Rodriguez |
| 8,514,790 B2 | 8/2013 | Drewes et al. |
| 8,798,084 B2 | 8/2014 | Pratt, Jr. et al. |
| 8,824,434 B2 | 9/2014 | Rao et al. |
| 9,927,807 B1 | 3/2018 | Ganjoo |
| 10,143,028 B1 | 11/2018 | Butler |
| 2002/0039892 A1 | 4/2002 | Lindell |
| 2006/0045113 A1 | 3/2006 | Palisca |
| 2006/0088011 A1 | 4/2006 | Iyer et al. |
| 2018/0139622 A1 | 5/2018 | Cornforth et al. |
| 2019/0182850 A1 | 6/2019 | Wang et al. |
| 2019/0253937 A1 | 8/2019 | Hsieh |
| 2019/0261444 A1 | 8/2019 | Axmon et al. |
| 2019/0313380 A1 | 10/2019 | Ye |

*Primary Examiner* — Christopher M Brandt

(57) ABSTRACT

A wireless communication system serves a geographically-diverse data service. Network circuitry transfers geographic-diversity data for Fifth Generation (5G) networks to user circuitry that indicates Distributed Unit (DU) geographic data and Common Unit (CU) geographic data. The user circuitry selects two or more of the 5G networks that use geographically-diverse DUs and geographically-diverse CUs based on the geographic-diversity data for the 5G networks. The user circuitry exchanges service data for the data service with service circuitry over the selected ones of the 5G networks. The service circuitry exchanges the service data with the user circuitry over the selected ones of the 5G networks.

20 Claims, 6 Drawing Sheets

US 10,728,749 B1

WIRELESS USER DATA SERVICE WITH ENHANCED RELIABILITY

RELATED CASES

This United States Patent Application is a continuation of U.S. patent application Ser. No. 16/246,804 that was filed on Jan. 14, 2019 and that is entitled "WIRELESS USER DATA SERVICE WITH ENHANCED RELIABILITY." U.S. patent application Ser. No. 16/246,804 is hereby incorporated by reference into this application.

TECHNICAL BACKGROUND

Wireless communication networks serve wireless user devices with mobile data services like voice calling, internet access, media streaming, and software downloading. The wireless data networks have wireless access points that exchange service data over the air with the wireless user devices. The wireless access points exchange the service data with wireless network cores. Popular forms of wireless networking are Fifth Generation New Radio (5GNR) and Long Term Evolution (LTE).

For 5GNR and LTE, wireless access points comprise Distributed Units (DUs) that are often mounted on towers. The wireless access points also comprise Common Units (CUs) that are enclosed in structures. The DUs and CUs communicate over fronthaul circuits. The CUs communicate with Fifth Generation (5G) and Fourth Generation (4G) network cores over backhaul circuits. In addition, the DUs, CUs, and network cores use various utility power supplies.

For 5GNR and LTE, the wireless user devices typically select wireless networks based on the best wireless signal. Unfortunately, the wireless networks experience network outages and service degradation due to weather, accidents, computer issues, and the like. To overcome the network outages, users may obtain multiple 5GNR and LTE wireless user devices to access multiple wireless networks at the same time. Current wireless user devices are not optimized to access multiple wireless networks in parallel to enhance reliability. Moreover, 5GNR wireless user devices dot not efficiently process geographic data for 5G networks to enhance 5G service reliability.

TECHNICAL OVERVIEW

A wireless communication system serves a geographically-diverse data service. Network circuitry transfers geographic-diversity data for Fifth Generation (5G) networks to user circuitry that indicates Distributed Unit (DU) geographic data and Common Unit (CU) geographic data. The user circuitry selects two or more of the 5G networks that use geographically-diverse DUs and geographically-diverse CUs based on the geographic-diversity data for the 5G networks. The user circuitry exchanges service data for the data service with service circuitry over the selected ones of the 5G networks. The service circuitry exchanges the service data with the user circuitry over the selected ones of the 5G networks.

DETAILED DESCRIPTION

Figure 1:
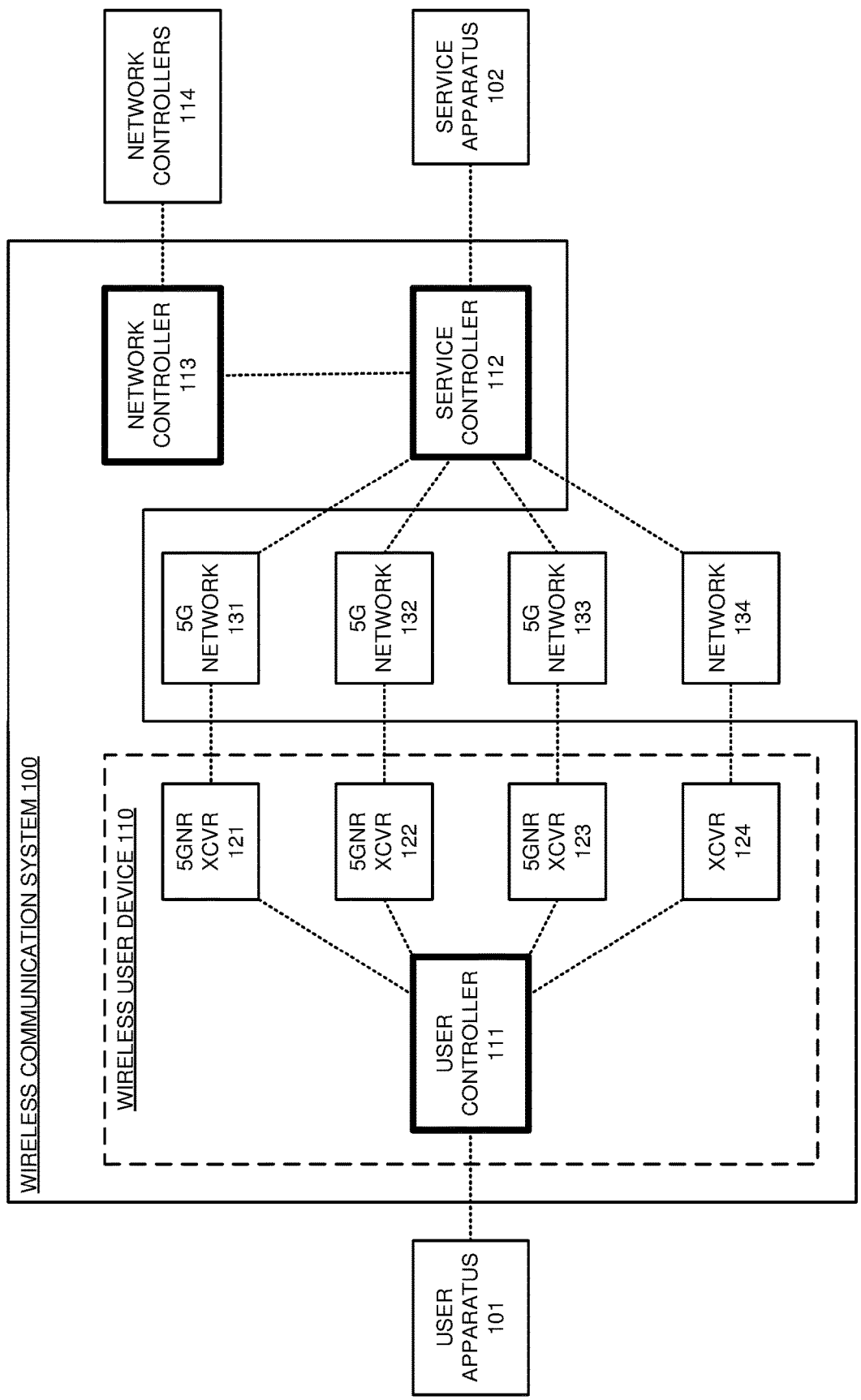
FIG. 1 illustrates a wireless communication system that serves a user apparatus with a user data service.

FIG. 1 illustrates wireless communication system 100 that serves user apparatus 101 with a user data service. Wireless communication system 100 comprises wireless user device 110, service controller 112, and network controller 113. Wireless user device 110 comprises user controller 111 and transceivers (XCVRs) 121-124. Fifth Generation New Radio (5GNR) transceivers 121-123 and Fifth Generation (5G) networks 131-133 use 5GNR. Transceiver 124 and network 134 use Long Term Evolution (LTE), Institute of Electrical and Electronic Engineers (IEEE) 802.11 (WIFI), or some other wireless communication protocol. User apparatus 101 is coupled to user controller 111. User controller 111 is coupled to transceivers 121-124. Transceivers 121-124 are coupled to networks 131-134. Networks 131-134 are coupled to service controller 112. Service controller 112 is coupled to service apparatus 102. Network controller 113 is coupled to service controller 112 and to other network controllers 114.

User apparatus 101 comprises a computer, display, vehicle, robot, drone, headset, or the like. Service apparatus 102 comprises a computer, network element, or another user apparatus. User apparatus 101 and service apparatus 102 communicate over user controller 111, transceivers 121-124, networks 131-134, and service controller 112. In some examples, user apparatus 101 comprises a client computer and service apparatus 102 comprises a server computer.

In wireless user device 110, transceivers 121-124 comprise baseband circuitry and radio circuitry. The radio circuitry comprises antennas, modulators, amplifiers, filters, digital/analog interfaces, processing circuitry, memory circuitry, firmware/software, and bus circuitry. The baseband circuitry comprises processing circuitry, memory circuitry, bus circuitry, and software. In the baseband circuitry, the processing circuitry executes operating systems and network applications that are stored in the memory circuitry.

5G networks 131-133 comprise network elements like gNodeBs, User Plane Functions (UPFs), Access and Mobility Management Functions (AMFs), Session Management Functions (SMFs), Authentication Server Functions (AUSFs), Policy Control Functions (PCFs), Unified Data Management (UDM), Application Functions (AFs), and typically other network functions. Network 134 comprises gateways, mobility managers, databases, and/or other network elements.

Controllers 111-114 each comprise processing circuitry, memory circuitry, bus circuitry, and software. The processing circuitry executes operating systems and controller applications that are stored in the memory circuitry. Network controllers 113-114 exchange geographic-diversity data for networks 131-134. The geographic-diversity data comprises geographic data for wireless access points, fronthaul circuits, backhaul circuits, network cores, and power supplies. The geographic data is usually encrypted in transit.

In wireless user device 110, transceivers 121-124 attach to networks 131-134. Network controller 113 transfers geographic-diversity data for attached networks 131-134 to controllers 111-112. User controller 111 selects transceivers 121-124 based on the geographic-diversity data for attached networks 131-134—although poorly performing networks are not typically selected. User controller 111 selects transceivers 121-124 that use geographically-diverse wireless access points, fronthaul circuits, backhaul circuits, network cores, and/or power supplies—in that order and to the extent feasible.

For the user data service, user controller 111 exchanges service data between user apparatus 101 and networks 131-134 over selected transceivers 121-124. For the user data service, service controller 112 exchanges the service data between networks 131-134 and service apparatus 102. Advantageously, user apparatus 101 and service apparatus 102 use geographically-diverse 5G network elements to enhance the reliability of their user data service.

In some examples, multiple user controllers like user controller 111 may communicate through service controller 112. Service controller 112 exchanges the service data with these user controllers over their selected networks 121-124. Highly-reliable and mobile video and/or voice conferencing could be implemented in this manner.

Figure 2:
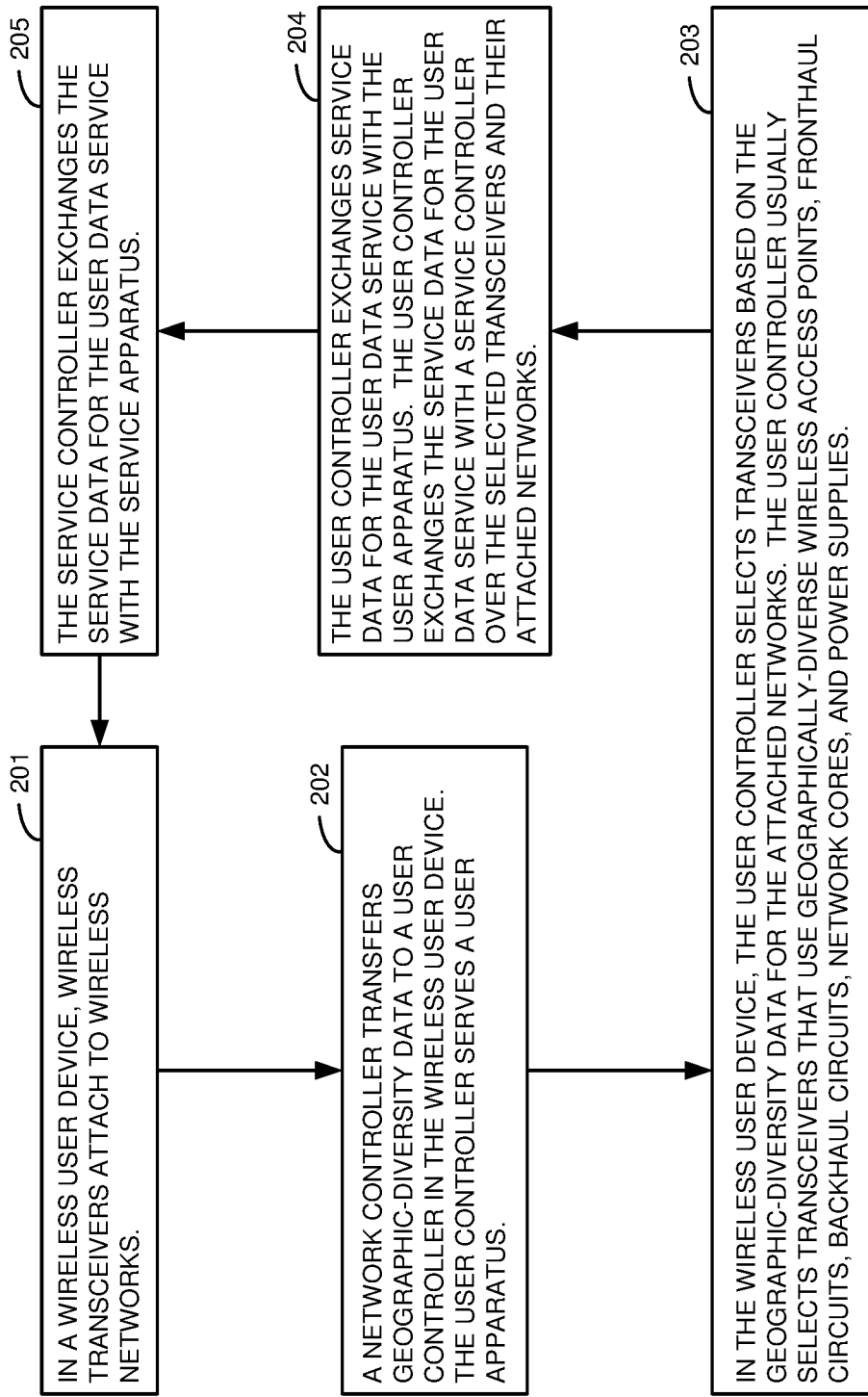
FIG. 2 illustrates the operation of a wireless communication network to serve a user apparatus with a user data service.

FIG. 2 illustrates the operation of a wireless communication system to serve a user apparatus with a user data service. In a wireless user device, wireless transceivers attach to various wireless networks (201). A network controller transfers geographic-diversity data for these networks to a user controller in the wireless user device (202). The user controller selects transceivers based on the geographic-diversity data for the networks (203). The user controller selects transceivers that use geographically-diverse wireless access points, fronthaul circuits, backhaul circuits, network cores, and/or power supplies. The user controller also avoids poorly performing networks. The user controller exchanges service data for the user data service with the user apparatus, and the service controller exchanges the service data with the user controller over the selected transceivers and attached networks (204). The service controller exchanges the service data for the user data service with the service apparatus (205). Advantageously, the user apparatus uses geographically-diverse 5G network elements to enhance its user data service.

Figure 3:
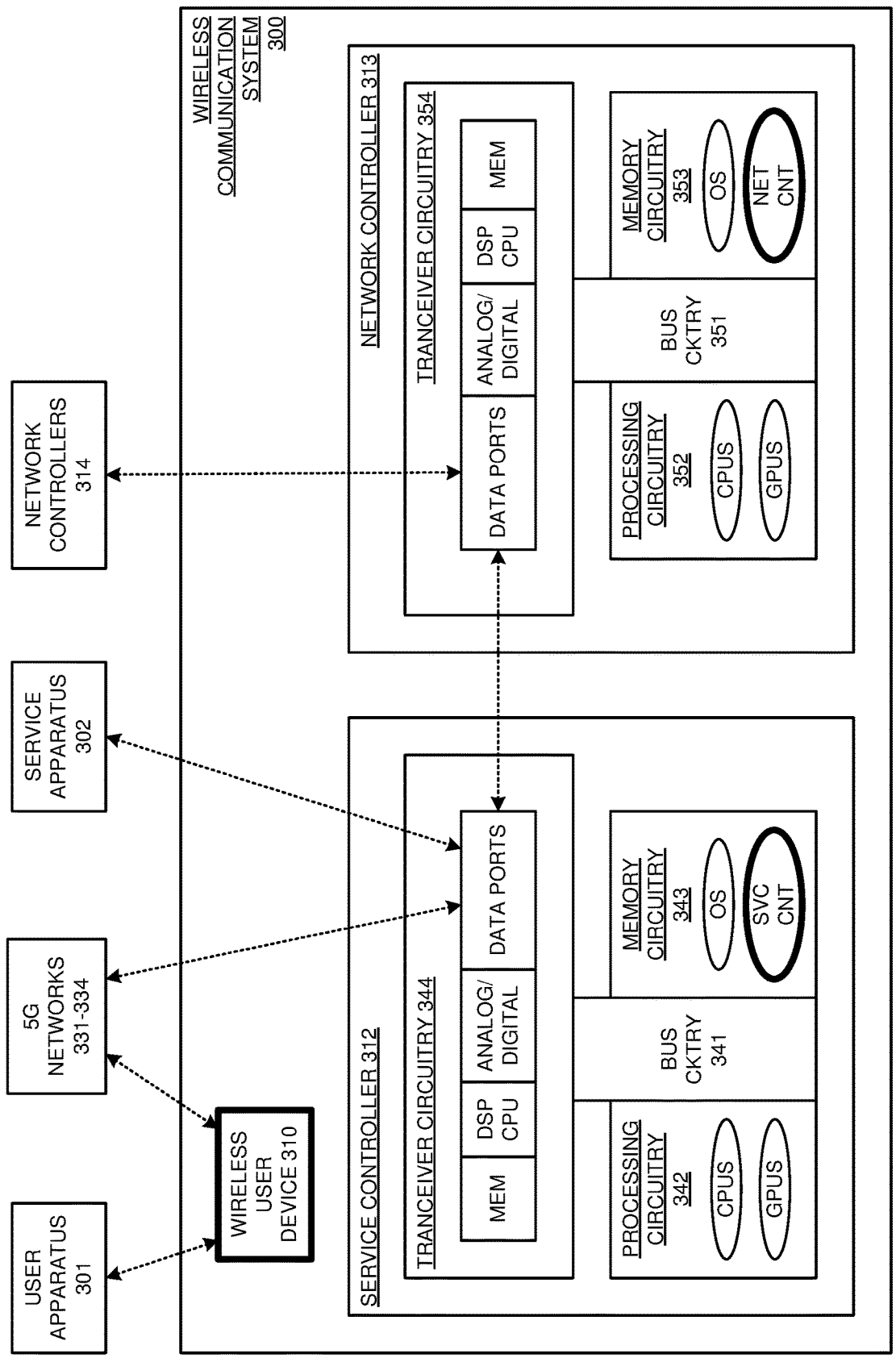
FIG. 3 illustrates a wireless communication system that serves a user apparatus with a user data service.

FIG. 3 illustrates wireless communication system 300 that serves user apparatus 301 with a user data service. Wireless communication system 300 is an example of wireless communication system 100 although system 100 may differ. Wireless communication system 300 comprises wireless user device 310, service controller 312, and network controller 313. Wireless user device 310 communicates with user apparatus 301 and 5G networks 331-334. Service controller 312 communicates with 5G networks 331-334 and service apparatus 302. Network controller 313 communicates with service controller 312 and network controllers 314. Network controller 313 exchanges control data with service controller 312 and network controllers 314. Service controller 312 exchanges control data with a user controller in wireless user device 310. User apparatus 301 and service apparatus 302 exchange service data over wireless user device 310, geographically-diverse 5G networks 331-334, and service controller 312 based on the control data.

Service controller 312 comprises bus circuitry 341, processing circuitry 342, memory circuitry 343, and transceiver circuitry 344. Bus circuitry 341 couples processing circuitry 342, memory circuitry 343, and transceiver circuitry 344. Processing circuitry 342 comprises Central Processing Units (CPUs), Graphic Processing Units (GPUs), and/or some other computer hardware. Memory circuitry 343 comprises volatile and non-volatile memories like flash, disc, tape, and the like. Memory circuitry 343 stores an operating system and service controller (SVC CNT) application. Transceiver circuitry 344 comprises memory (MEM), Digital Signal Processor (DSP), CPU, analog-to-digital interface, and data ports. The data ports in transceiver circuitry 344 communicate with 5G networks 331-334, service apparatus 302, and network controller 313. Processing circuitry 342 executes the operating system and service controller application to perform service controller tasks as described herein.

Network controller 313 comprises bus circuitry 351, processing circuitry 352, memory circuitry 353, and transceiver circuitry 354. Bus circuitry 351 couples processing circuitry 352, memory circuitry 353, and transceiver circuitry 354. Processing circuitry 352 comprises CPUs, GPUs, and/or some other computer hardware. Memory circuitry 353 comprises volatile and non-volatile memories like flash, disc, tape, and the like. Memory circuitry 353 stores an operating system and service controller application. Transceiver circuitry 354 comprises memory, DSP, CPU, analog-to-digital interface, and data ports. The data ports in transceiver circuitry 354 communicate with service controller 312 and with network controllers 314. Processing circuitry 352 executes the operating system and network controller application to perform network controller tasks as described herein.

In operation, wireless user device 310 attaches to 5G networks 331-334. Network controller 313 exchanges geographic-diversity data for 5G networks 331-334 with network controllers 314. The geographic-diversity data indicates geographic locations and/or diversity for wireless access points, fronthaul circuits, backhaul circuits, network cores, and power supplies. Network controller 313 transfers geographic-diversity data for networks 331-334 to service controller 312. Service controller 312 transfers the geographic-diversity data for networks 331-334 to a user controller in wireless user device 310. The user controller selects 5G networks 331-334 based on the geographic-diversity data. The user controller selects geographically-diverse wireless access points, fronthaul circuits, backhaul circuits, network cores, and/or power supplies to the extent feasible. For the user data service, wireless user device 310 exchanges service data between user apparatus 301 and selected 5G networks 331-334. Service controller 312 exchanges the service data between 5G networks 531-534 and service apparatus 302. Advantageously, the user data service uses geographically-diverse 5G network elements.

Figure 4:
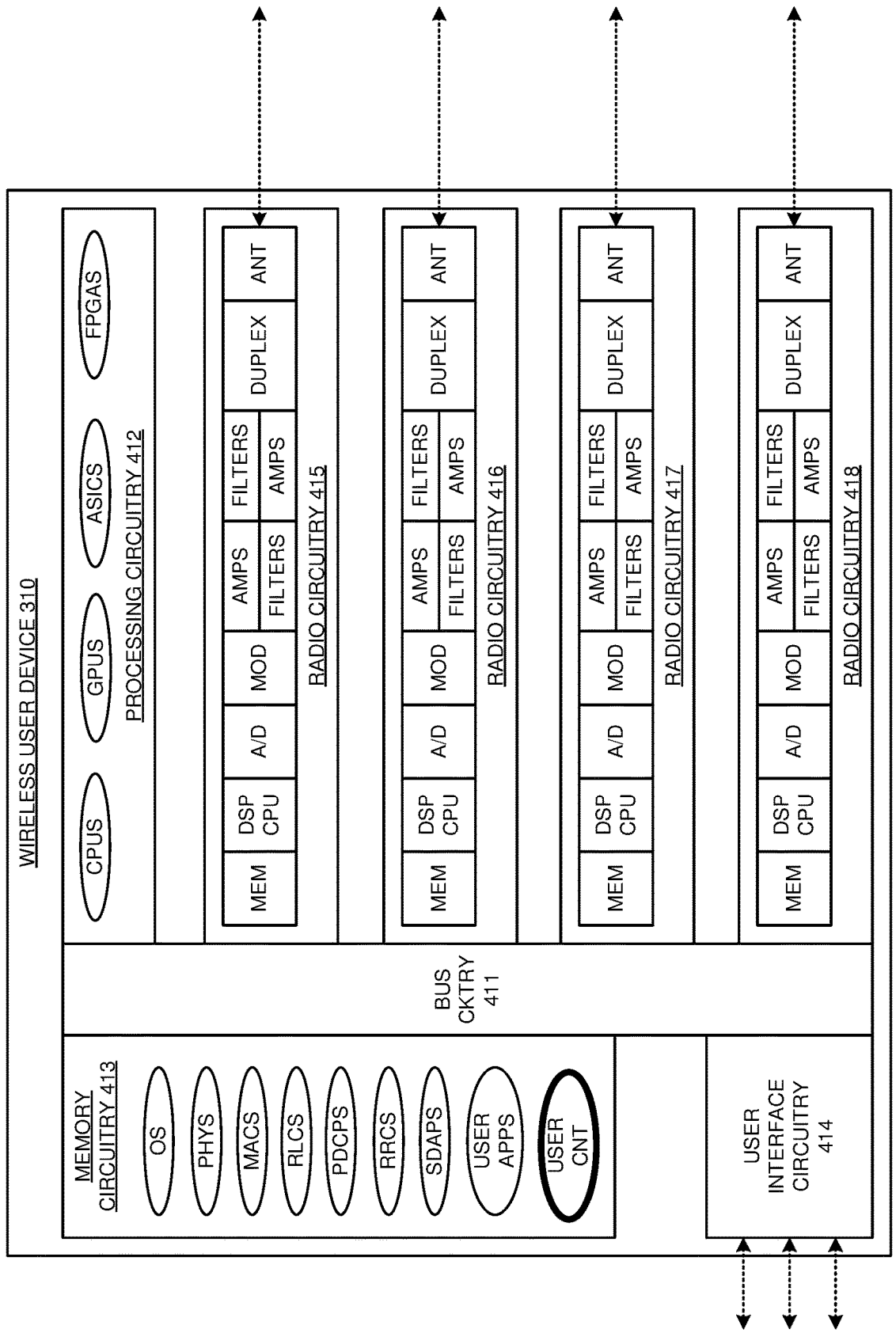
FIG. 4 illustrates a wireless user device that serves a user apparatus with a user data service.

FIG. 4 illustrates wireless user device 310 that serves user apparatus 301 with the user data service. Wireless user device 310 is an example of wireless user device 110 although device 110 may differ. Wireless user device 310 comprises bus circuitry 411, processing circuitry 412, memory circuitry 413, user interface circuitry 414, and radio circuitry 415-418. Bus circuitry 411 couples processing circuitry 412, memory circuitry 413, user interface circuitry 414, and radio circuitry 415-418. Processing circuitry 412 comprises CPUs, GPUs, Application Specific Integrated Circuits (ASICs), Field Programmable Gate Arrays (FPGAs) and/or some other computer hardware. Memory circuitry 413 comprises volatile and non-volatile memories like flash, disc, tape, and the like. Memory circuitry 413 stores operating systems, network applications, user applications, and a user controller application. The network applications comprise Physical Layer (PHY), Media Access Control (MAC), Radio Link Control (RLC), Packet Data Convergence Protocol (PDCP), Radio Resource Control (RRC), Service Data Application Protocol (SDAP), and the like. User interface circuitry 414 comprises a wireless and/or wireline transceiver.

Radio circuitry 415-418 each comprise antennas (ANT), duplexers (DUPLEX), filters, amplifiers (AMPS), modulators (MOD), analog/digital interfaces (A/D), DSP/CPUs, and memory (MEM). The antennas in radio circuitry 415-418 exchange wireless data with 5G networks 331-334. The DSP/CPUs execute firmware/software to drive the exchange of the data between the antennas and the radio memory. Processing circuitry 412 executes the operating systems and network applications to drive the exchange of the data between the radio memory and memory circuitry 413. The CPUs execute the user applications to drive the exchange of service data between memory circuitry 413 and user interface circuitry 414. User interface circuitry 414 exchanges the service data with user apparatus 301. The CPUs execute the operating system and user controller application to perform user controller tasks as described herein.

In operation, radio circuitry 415-418 attaches to 5G networks 331-334. The user controller application receives geographic-diversity data for 5G networks 331-334 from service controller 312. The geographic-diversity data indicates geographic locations and/or diversity for wireless access points, fronthaul circuits, backhaul circuits, network cores, and power supplies. The user controller selects radio circuitry 415-418 for the user data service based on the geographic-diversity data. The user controller application selects adequately performing and geographically-diverse wireless access points, fronthaul circuits, backhaul circuits, network cores, and/or power supplies to the extent feasible. For the user data service, selected radio circuitry 415-418 exchanges service data with selected 5G networks 331-334. User interface circuitry 414 exchanges the service data with user apparatus 301.

A user application receives UL service data from user apparatus 301 over user interface circuitry 414. The network applications and user controller application generate UL data and signaling for storage in memory circuitry 413 responsive to the UL service data. The user controller application processes geographic-diversity data to select UL radio circuitry 415-418. For example, the user controller application may select and use radio circuitry 415-416 for the user data service but not radio circuitry 417-418. Advantageously, the user controller application selects geographic-diverse 5G network elements for the user data service.

The network applications transfer the UL data (including service data) and signaling from memory circuitry 413 to the selected UL radio circuitry 415-418. In selected UL radio circuitry 415-418, the memories receive the UL data and signaling from memory circuitry 413. The DSP/CPUs transfer corresponding UL signals to the analog/digital interface. The analog/digital interface converts the digital UL signals into analog UL signals for the modulators. The modulators up-convert the UL signals to their carrier frequencies. The amplifiers boost the UL signals for the filters which attenuate unwanted out-of-band energy. The filters transfer the UL signals through the duplexers to the antennas. The electrical UL signals drive the antennas to emit corresponding wireless UL signals to 5G networks 331-334.

In selected radio circuitry 415-418, the antennas receive wireless Downlink (DL) signals from selected 5G networks 331-334 and transfer corresponding electrical DL signals through the duplexers to the amplifiers. The amplifiers boost the DL signals for filters which attenuate unwanted energy. In modulation, demodulators down-convert the DL signals from their carrier frequencies. The analog/digital interfaces convert the analog DL signals into digital DL signals for the DSP/CPUs. The DSP/CPUs recover DL data (including service data) and signaling from the DL signals. The DSP/CPUs store the DL data and signaling in the radio memories. The DSP/CPUs transfer the recovered DL data and signaling to memory circuitry 413. The network controller application, user controller application, and user applications process the DL data and signaling in memory circuitry 413. The pertinent user application transfers the DL service data to user interface circuitry 414 for delivery to user apparatus 301.

The PHYs map between the MAC transport channels and PHY transport channels. The PHY functions comprise packet formation/deformation, windowing/de-windowing, guard-insertion/guard-deletion, parsing/de-parsing, control insertion/removal, interleaving/de-interleaving, Forward Error Correction (FEC) encoding/decoding, rate matching/de-matching, scrambling/descrambling, modulation mapping/de-mapping, channel estimation/equalization, Fast Fourier Transforms (FFTs)/Inverse FFTs (IFFTs), channel coding/decoding, layer mapping/de-mapping, precoding, Discrete Fourier Transforms (DFTs)/Inverse DFTs (IDFTs), and Resource Element (RE) mapping/de-mapping.

The MACs map between the MAC transport channels and MAC logical channels. MAC functions include buffer status, power headroom, channel quality, Hybrid Automatic Repeat Request (HARQ), user identification, random access, user scheduling, and Quality-of-Service (QoS). The RLCs map between the MAC logical channels and Protocol Data Units (PDUs). RLC functions comprise ARQ, sequence numbering and resequencing, segmentation and resegmentation. The RLCs exchange data and signaling with the PDCPs. The PDCPs map between the PDUs from the RLCs and Service Data Units (SDUs) for the RRCs/SDAPs. PDCP functions comprise security ciphering, header compression and decompression, sequence numbering and re-sequencing, de-duplication. The PDCPs exchange SDUs with the RRCs and SDAPs.

The RRCs interact with wireless network controllers like Access and Mobility Functions (AMFs) and/or Mobility Management Entities (MMEs) to establish and terminate data sessions. The RRCs support N1 and Non-Access Stratum (NAS) messaging with the MMEs/AMFs. The RRCs handle security and key management, handover operations, status reporting, QoS, system broadcasts, and network pages. The SDAPs exchange S3 data with User Plane Functions (UPFs) under the control of Session Management Functions (SMFs). The SDAPs map between the SDUs and the QoS flows and mark the QoS flows with the proper QoS.

Figure 5:
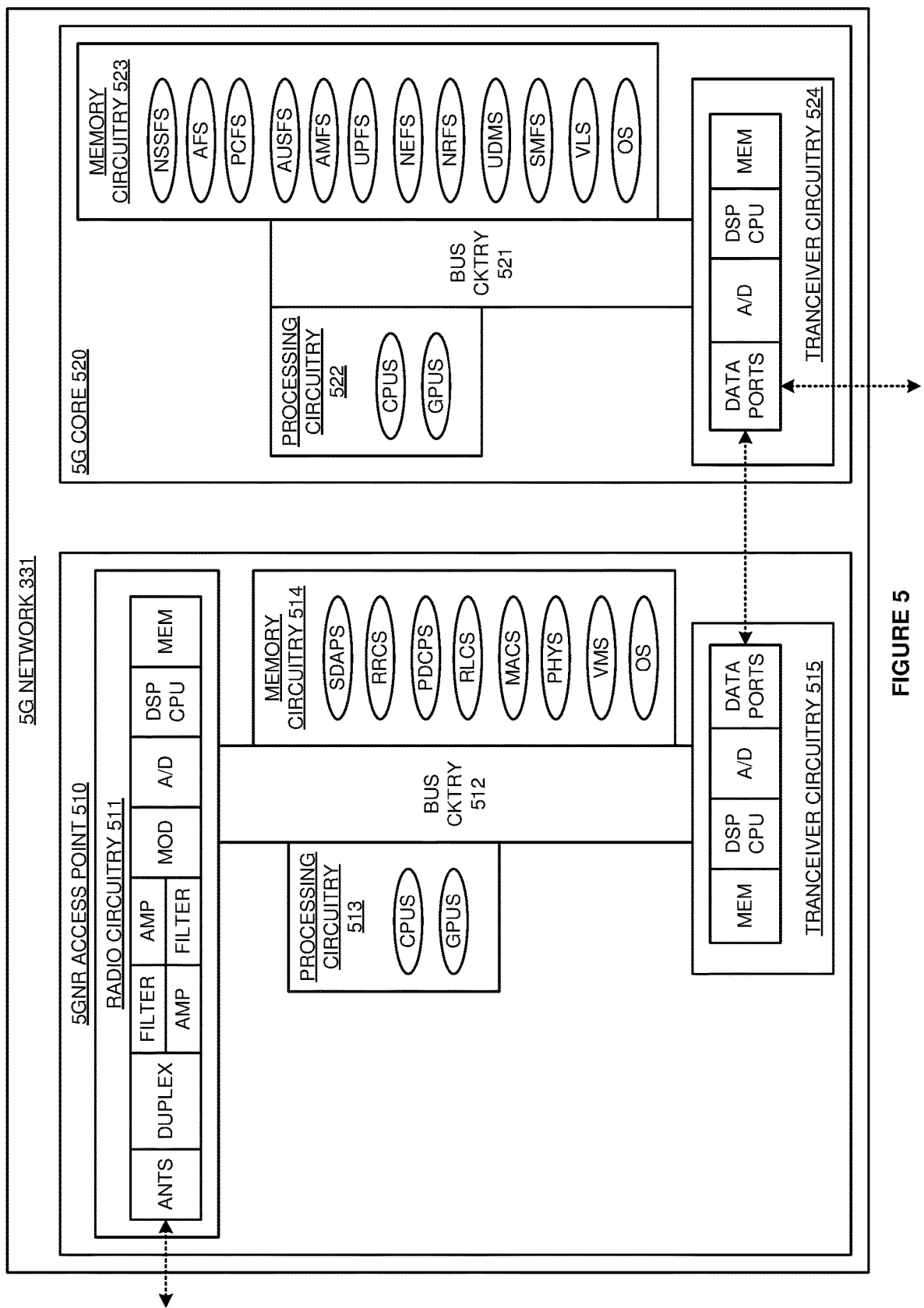
FIG. 5 illustrates a Fifth Generation (5G) network that serves a user apparatus with a user data service.

FIG. 5 illustrates 5G network 331 that serves user apparatus 301 with a user data service. 5G network 331 is an example of 5G networks 131-133 and 332-334, although these networks may differ. 5G network 331 comprises 5GNR access point 510 and 5G core 520. 5GNR access point 510 is coupled to 5G core 520. 5G network 331 typically has additional 5GNR access points that are coupled to 5G core 520 but that are not shown for clarity.

5GNR access point 510 comprises radio circuitry 511, bus circuitry 512, processing circuitry 513, memory circuitry 514, and transceiver circuitry 515. Bus circuitry 512 couples radio circuitry 511, processing circuitry 513, memory circuitry 514, and transceiver circuitry 515. Processing circuitry 513 comprises CPUs, GPUs, and/or some other computer hardware. Memory circuitry 514 comprises volatile and non-volatile memories like flash, disc, tape, and the like. Memory circuitry 514 stores operating systems, network applications (PHY, MAC, RLC, PDCP, RRC, SDAP), and the like. Transceiver circuitry 515 comprises memory, DSP, CPU, analog-to-digital interface, and data ports. The data ports in transceiver circuitry 515 communicate with 5G core 520.

Radio circuitry 511 comprises antennas, duplexers, filters, amplifiers, modulators, analog/digital interfaces, DSP/CPUs, and memory. The antennas exchange wireless data with wireless user device 310. The DSP/CPUs execute firmware/software to drive the exchange of the data between the antennas and the radio memory. Processing circuitry 513 executes the operating systems and network applications to drive the exchange of the data between the radio memory and memory circuitry 514. Processing circuitry 513 executes the operating systems and network applications to drive the exchange of the data between memory circuitry 514 and transceiver circuitry 515. Transceiver circuitry 515 exchanges the data with transceiver circuitry 524 in 5G core 520.

The antennas in radio circuitry 511 receive wireless Uplink (UL) signals from wireless user device 310 and transfer corresponding electrical UL signals through the duplexers to the amplifiers. The amplifiers boost the UL signals for filters which attenuate unwanted energy. In modulation, demodulators down-convert the UL signals from their carrier frequencies. The analog/digital interfaces convert the analog UL signals into digital UL signals for the DSP/CPUs. The DSP/CPUs recover UL data (including service data) and signaling from the UL signals. The DSP/CPUs store the UL data and signaling in the memory. The DSP/CPUs transfer the recovered UL data and signaling to memory circuitry 514. The network applications process the UL data and signaling in memory circuitry 514. Transceiver circuitry 515 transfer the UL data and signaling to 5G core 520.

Transceiver circuitry 515 receives DL data (including service data) and signaling from 5G core 520 and stores the DL data and signaling in memory circuitry 514. The network applications transfer the DL data and signaling from memory circuitry 514 to the radio circuitry 511. In radio circuitry 511, the memory receive the DL data and signaling from memory circuitry 514. The DSP/CPUs transfer corresponding DL signals to the analog/digital interface. The analog/digital interface converts the digital DL signals into analog DL signals for the modulators. The modulators up-convert the DL signals to their carrier frequencies. The amplifiers boost the DL signals for the filters which attenuate unwanted out-of-band energy. The filters transfer the DL signals through the duplexers to the antennas. The electrical DL signals drive the antennas to emit corresponding wireless DL signals to wireless user device 310.

For the user data service, 5GNR access point 510 exchanges service data between wireless user device 310 and 5G core 520. The PHYs map between the MAC transport channels and PHY transport channels. The PHY functions comprise packet formation/deformation, windowing/de-windowing, guard-insertion/guard-deletion, parsing/de-parsing, control insertion/removal, interleaving/de-interleaving, FEC encoding/decoding, rate matching/de-matching, scrambling/descrambling, modulation mapping/de-mapping, channel estimation/equalization, FFTs/IFFTs, channel coding/decoding, layer mapping/de-mapping, precoding, DFTs/IDFTs, and RE mapping/de-mapping.

The MACs map between the MAC transport channels and MAC logical channels. MAC functions include buffer status, power headroom, channel quality, HARQ, user identification, random access, user scheduling, and QoS. The RLCs map between the MAC logical channels and PDUs. RLC functions comprise ARQ, sequence numbering and resequencing, segmentation and resegmentation. The RLCs exchange data and signaling with the PDCPs. The PDCPs map between the PDUs from the RLCs and SDUs for the RRCs/SDAPs. PDCP functions comprise security ciphering, header compression and decompression, sequence numbering and re-sequencing, de-duplication. The PDCPs exchange SDUs with the RRCs and SDAPs.

The RRCs interact with wireless network controllers like AMFs and/or MMEs to establish and terminate data sessions. The RRCs support N1/N2 messaging with the AMFs. The RRCs handle security and key management, handover operations, status reporting, QoS, system broadcasts, and network pages. The SDAPs exchange S3 data with UPFs under the control of SMFs. The SDAPs map between the SDUs and the QoS flows and mark the QoS flows with the proper QoS.

5GNR access point 510 is depicted as an integrated system for clarity, but 5GNR access point 510 may be distributed across Distributed Units (DUs) and Common Units (CUs). The connections between the DUs and the CUs are fronthaul circuits, and the connections between the CUs and 5G core 520 are backhaul circuits. In some DU/CU examples, the DUs host radio circuitry 511, the CUs host circuitry 512-515, and the fronthaul circuits comprise Common Public Radio Interface (CPRI) links. In other DU/CU examples, the DUs host radio circuitry 511 and DUs/CUs each have a portion of circuitry 512-515. In these distributed examples, the DUs typically execute the PHYs, the CUs typically execute the RRCs/SDAPs, and the DUs or CUs execute the MACs, RLCs, and PDCPs depending on the protocol split. The user controller may use geographic-diversity data for DUs, fronthaul circuits, CUs, backhaul circuits, and/or core 520 to select 5GNR network 331.

5G core 520 comprises bus circuitry 521, processing circuitry 522, memory circuitry 523, and transceiver circuitry 524. Bus circuitry 521 couples processing circuitry 522, memory circuitry 523, and transceiver circuitry 524. Processing circuitry 522 comprises CPUs, GPUs, and/or some other computer hardware. Memory circuitry 523 comprises volatile and non-volatile memories like flash, disc, tape, and the like. Memory circuitry 523 stores operating systems, virtual layers (VLS) and network element applications like User Plane Function (UPF), Access and Mobility Management Function (AMF), Session Management Function (SMF), Authentication Server Function (AUSF), Policy Control Function (PCF), Unified Data Management (UDM), Application Function (AF), Network Repository Function (NRF), Network Slice Selection Function (NSSF), Network Exposure Function (NEF), and typically other network functions. Processing circuitry 522 executes the operating systems, virtual layers, and network element applications. Transceiver circuitry 524 comprises memory, DSP, CPU, analog-to-digital interface, and data ports. The data ports in transceiver circuitry 524 communicate with 5GNR access point 510 and service controller 312.

The AMFs/SMFs in 5G core 520 exchange N1 and N2 signaling with the RRCs in 5GNR access point 510. The UPFs in 5G core 520 exchange N3 data (including service data) with SDAPs in 5GNR access point 510. The UPFs exchange the service data with service controller 312. The AMFs and SMFs interact with the network applications to control wireless 5GNR user devices, access points, and UPFs.

In 5G core 520 the operating systems drive the hardware and support the virtual layers. The virtual layers comprise virtual switches, virtual machines, hypervisors, and the like that support the network element applications. The UPFs route data packets and form anchor points for user mobility. The UPFs also inspect packets and apply Quality-of-Service. The AMFs manage authentication, authorization, connections, mobility, N1 signaling, ciphering, registration, and security. The SMFs manage session establishment, modification, and release. The SMFs handle network addressing, Dynamic Host Control Protocol (DHCP), N1 signaling, downlink notification, and traffic steering. The AUSFs authenticate and authorize users. The UDMs generate user authentication credentials and support user identification, authorization, and subscriptions. The PCFs provide policy rules and decisions. The AFs route traffic and implement policy controls. The NRFs enable service discovery and maintain network function profiles/instances. The NSSFs select network slices to serve users and determine slice assistance information and AMFs. The NEFs expose capabilities and events. The NEFs securely interact with external applications and translate internal/external information.

Figure 6:
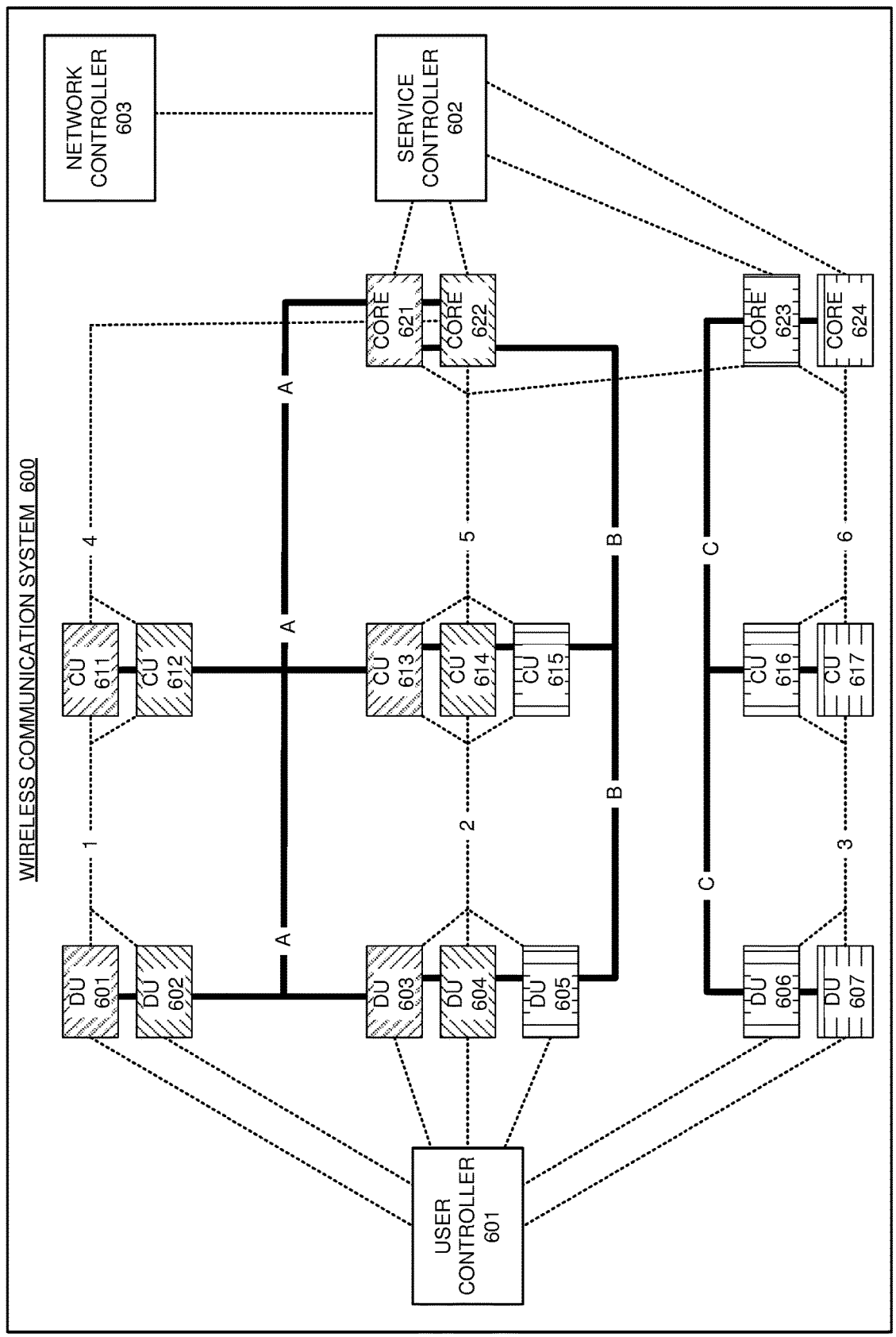
FIG. 6 illustrates a wireless communication system that serves a user apparatus with a user data service.

FIG. 6 illustrates wireless communication system 600 that serves a user apparatus with a user data service. Wireless communication system 600 is an example of wireless communication system 100, although system 100 may differ. Wireless communication system 600 comprises user controller 601, service controller 602, and network controller 603. For clarity, the user apparatus and the service apparatus are not shown but they would be coupled to controllers 601-602 as described above.

In wireless communication system 600, a first 5G network is indicated by diagonal lines that go down to the right, and the first 5G network comprises DU 601, DU 603, CU 611, CU 613, and core 621. A second 5G network is indicated by diagonal lines that go down to the left and comprises DU 602, DU 604, CU 612, CU 614, and core 622. A third 5G network is indicated by vertical lines and comprises DUs 605-606, CUs 615-616, and core 623. A fourth 5G network is indicated by horizontal lines and comprises DU 607, CU 617, and core 624.

DUs 601-602 are co-located on a common tower. DUs 603-605 are co-located on a common tower. DUs 606-607 are co-located on a common tower. CUs 611-612 are co-located in a common structure. CUs 613-615 are co-located in a common structure. CUs 616-617 are co-located in a common structure. Cores 621-622 are co-located in a common data center. Cores 623-624 are co-located in a common data center. These co-locations are exemplary and simplified for clarity.

DUs 601-602 and CUs 611-612 share fronthaul circuits 1. DUs 603-605 and CUs 613-615 share fronthaul circuits 2. DUs 606-607 and CUs 616-617 share fronthaul circuits 3. CUs 611-612 and cores 621-622 share backhaul circuits 4. CUs 613-615 and cores 621-622 share backhaul circuits 5. CUs 616-617 and cores 623-624 share backhaul circuits 6. These circuits are exemplary and simplified for clarity.

DUs 601-603, CUs 611-613, and cores 621-622 share utility power supply A. DUs 603-605, CUs 613-615, and cores 621-622 share utility power supply B. DUs 606-607, CUs 616-617, and cores 623-624 share utility power supply C. These power supplies are exemplary and simplified for clarity.

Network controller 603 hosts geographic-diversity data for DUs 601-607, fronthaul circuits 1-3, CUs 611-617, backhaul circuits 4-6, cores 621-624, and utility power supplies A, B, and C. The geographic-diversity data may be geographic coordinates, geographic areas, or some other geographic indicators. Network controller 603 transfers the geographic-diversity data to service controller 602 and user controller 601 based on the geographic location of user controller 601. For example, network controller 603 may serve geographic-diversity data for all attached 5G networks within a two-mile radius of user controller 601.

For a given user data service, user controller 601 eliminates poorly performing networks from the selection process and then selects geographically diverse DUs. If more DUs qualify than necessary, then user controller 601 selects DUs with geographically diverse fronthaul circuits. If more DUs still qualify than necessary, then user controller 601 selects DUs with geographically diverse CUs. If more DUs still qualify than necessary, then user controller 601 selects DUs with geographically diverse backhaul circuits. If more DUs still qualify than necessary, then user controller 601 selects DUs with geographically diverse cores. If more DUs still qualify than necessary, then user controller 601 selects DUs with geographically diverse power supplies. If more DUs still qualify than necessary, then user controller 601 selects DUs with the best network performance.

For example, user controller 601 might select DU 603 and DU 606 for a "two-link" user data service because they are geographically-diverse and feature geographically-diverse fronthaul, CU, backhaul, core, and power. User controller 601 might select DU 602, DU 603, and DU 607 for a "three-link" user data service because they are geographically-diverse and feature geographically-diverse fronthaul, CU, backhaul, and power (although DUs 602-603 have co-located cores 621-622). Advantageously, user controller 601 and service controller 602 use geographically-diverse 5G network elements to enhance the reliability of the user data service.

In some examples, network controller 603 transfers the geographic-diversity data to service controller 602 based on the geographic location of user controller 601. For a given user data service, service controller 602 selects the DUs based on the geographic diversity data. Service controller 602 then transfers its DU selections to user controller 601. In response, user controller 601 selects the DUs to use for the user data service based on the recommended selections from service controller 602.

In some examples, multiple user controllers like user controller 601 communicate with one another through service controller 602 for the user data service. Service controller 602 exchanges the service data with these user controllers over their selected 5G networks. Highly-reliable and mobile video and/or voice conferencing could be implemented in this manner.

The wireless data network circuitry described above comprises computer hardware and software that form special-purpose controllers that serve users with a highly-enhanced wireless data service. The computer hardware comprises processing circuitry like CPUs, DSPs, GPUs, transceivers, bus circuitry, and memory. To form these computer hardware structures, semiconductors like silicon or germanium are positively and negatively doped to form transistors. The doping comprises ions like boron or phosphorus that are embedded within the semiconductor material. The transistors and other electronic structures like capacitors and resistors are arranged and metallically connected within the semiconductor to form devices like logic circuitry and storage registers. The logic circuitry and storage registers are arranged to form larger structures like control units, logic units, and Random-Access Memory (RAM). In turn, the control units, logic units, and RAM are metallically connected to form CPUs, DSPs, GPUs, transceivers, bus circuitry, and memory.

In the computer hardware, the control units drive data between the RAM and the logic units, and the logic units operate on the data. The control units also drive interactions with external memory like flash drives, disk drives, and the like. The computer hardware executes machine-level software to control and move data by driving machine-level inputs like voltages and currents to the control units, logic units, and RAM. The machine-level software is typically compiled from higher-level software programs. The higher-level software programs comprise operating systems, utilities, user applications, and the like. Both the higher-level software programs and their compiled machine-level software are stored in memory and retrieved for compilation and execution. On power-up, the computer hardware automatically executes physically-embedded machine-level software that drives the compilation and execution of the other computer software components which then assert control. Due to this automated execution, the presence of the higher-level software in memory physically changes the structure of the computer hardware machines into special-purpose controllers that serve users with a highly-enhanced wireless data service.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. Thus, the invention is not limited to the specific embodiments described above, but only by the following claims and their equivalents.

What is claimed is:

1. A method of operating a wireless communication system to serve a geographically-diverse data service, the method comprising
    network circuitry transferring geographic-diversity data for Fifth Generation (5G) networks to user circuitry that indicates Distributed Unit (DU) geographic data and Common Unit (CU) geographic data;
    the user circuitry selecting two or more of the 5G networks that use geographically-diverse DUs and that use geographically-diverse CUs based on the geographic-diversity data for the 5G networks;
    the user circuitry exchanging service data for the data service with service circuitry over the selected ones of the 5G networks; and
    the service circuitry exchanging the service data with the user circuitry over the selected ones of the 5G networks.

2. The method of claim 1 wherein:
    the network circuitry transferring the geographic-diversity data comprises transferring fronthaul geographic data; and
    the user circuitry selecting the 5G networks based on the geographic-diversity data comprises selecting the 5G networks that use geographically-diverse fronthaul.

3. The method of claim 2 wherein:
    the network circuitry transferring the geographic-diversity data comprises transferring backhaul geographic data; and
    the user circuitry selecting the 5G networks based on the geographic-diversity data comprises selecting the 5G networks that use geographically-diverse backhaul.

4. The method of claim 1 wherein:
    the network circuitry transferring the geographic-diversity data comprises transferring network core geographic data; and
    the user circuitry selecting the 5G networks based on the geographic-diversity data comprises selecting the 5G networks that use geographically-diverse network cores.

5. The method of claim 1 wherein:
    the network circuitry transferring the geographic-diversity data comprises transferring power supply geographic data; and
    the user circuitry selecting the 5G networks based on the geographic-diversity data comprises selecting the 5G networks that use geographically-diverse power supplies.

6. The method of claim 1 further comprising the user circuitry wirelessly exchanging the service data for the data service with a user headset.

7. The method of claim 1 further comprising the user circuitry wirelessly exchanging the service data for the data service with a user vehicle.

8. The method of claim 1 further comprising the user circuitry wirelessly exchanging the service data for the data service with a user robot.

9. The method of claim 1 wherein the data service comprises video conferencing.

10. The method of claim 1 wherein the geographic-diversity data comprises geographic coordinates.

11. A wireless communication system to serve a geographically-diverse data service, the wireless communication system comprising:
    network circuitry configured to transfer geographic-diversity data for Fifth Generation (5G) networks to user circuitry that indicates Distributed Unit (DU) geographic data and Common Unit (CU) geographic data;
    the user circuitry configured to select two or more of the 5G networks that use geographically-diverse DUs and that use geographically-diverse CUs based on the geographic-diversity data for the 5G networks;
    the user circuitry configured to exchange service data for the data service with service circuitry over the selected ones of the 5G networks; and
    the service circuitry configured to exchange the service data with the user circuitry over the selected ones of the 5G networks.

12. The wireless communication system of claim 11 wherein:
    the geographic-diversity data comprises fronthaul geographic data; and
    the user circuitry is configured to select the 5G networks that use geographically-diverse fronthaul.

13. The wireless communication system of claim 12 wherein:
    the geographic-diversity data comprises backhaul geographic data; and
    the user circuitry is configured to select the 5G networks that use geographically-diverse backhaul.

14. The wireless communication system of claim 11 wherein:
    the geographic-diversity data comprises network core geographic data; and
    the user circuitry is configured to select the 5G networks that use geographically-diverse network cores.

15. The wireless communication system of claim 11 wherein:
    the geographic-diversity data comprises power supply geographic data; and the user circuitry is configured to select the 5G networks that use geographically-diverse power supplies.

16. The wireless communication system of claim 11 further comprising the user circuitry configured to wirelessly exchange the service data for the data service with a user headset.

17. The wireless communication system of claim 11 further comprising the user circuitry configured to wirelessly exchange the service data for the data service with a user vehicle.

18. The wireless communication system of claim 11 further comprising the user circuitry configured to wirelessly exchange the service data for the data service with a user robot.

19. The wireless communication system of claim 11 wherein the data service comprises video conferencing.

20. The wireless communication system of claim 11 wherein the geographic-diversity data comprises geographic coordinates.

\* \* \* \* \*